(12) United States Patent
Oigawa

(10) Patent No.: US 9,438,887 B2
(45) Date of Patent: Sep. 6, 2016

(54) DEPTH MEASUREMENT APPARATUS AND CONTROLLING METHOD THEREOF

(71) Applicant: CANON KABUSHIKI KAISHA, Tokyo (JP)

(72) Inventor: Makoto Oigawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 316 days.

(21) Appl. No.: 14/259,190

(22) Filed: Apr. 23, 2014

(65) Prior Publication Data

US 2014/0320610 A1    Oct. 30, 2014

(30) Foreign Application Priority Data

Apr. 26, 2013  (JP) ................................. 2013-093786

(51) Int. Cl.
*H04N 13/02*  (2006.01)
*G06K 9/00*  (2006.01)
*G06T 7/00*  (2006.01)

(52) U.S. Cl.
CPC ......... *H04N 13/0239* (2013.01); *G06T 7/0075* (2013.01); *G06T 2207/10012* (2013.01); *H04N 13/0271* (2013.01)

(58) Field of Classification Search
CPC ..................... H04N 13/0282; H04N 13/0271; G06T 7/0075
See application file for complete search history.

(56) References Cited

U.S. PATENT DOCUMENTS

| 7,098,998 B2* | 8/2006 | Terauchi | G06T 7/0075 348/139 |
| 7,767,946 B2 | 8/2010 | Utagawa | |
| 9,299,151 B2* | 3/2016 | Ishihara | G06T 7/0069 |
| 2014/0293006 A1* | 10/2014 | Masuda | H04N 13/0022 348/43 |
| 2014/0293117 A1* | 10/2014 | Murakami | G02B 21/365 348/349 |
| 2014/0333726 A1* | 11/2014 | Tokui | H04N 5/208 348/46 |

FOREIGN PATENT DOCUMENTS

| JP | 2008-304808 A | 12/2008 |
| JP | 2011-007867 A | 1/2011 |

\* cited by examiner

*Primary Examiner* — Dave Czekaj
*Assistant Examiner* — Tsion B Owens
(74) *Attorney, Agent, or Firm* — Fitzpatrick, Cella, Harper & Scinto

(57) ABSTRACT

A depth measurement apparatus is adapted for acquiring a first and second image signals, calculating a correlation value for plural shift amounts, acquiring plural provisional shift amounts, reconstructing the first image signal using a filter corresponding to the provisional shift amounts, analyzing a contrast change by reconstruction, and determining depth on the basis of contrast analysis. The provisional shift amount is acquired by determining a first shift amount at which an extreme value of the correlation value is given, and a first range, which is a range of a predetermined shift amount including the first shift amount, into a plurality of second ranges, and acquiring provisional shift amounts for each of the second ranges.

15 Claims, 17 Drawing Sheets

DEPTH MEASUREMENT APPARATUS AND CONTROLLING METHOD THEREOF

BACKGROUND OF THE INVENTION

1. Field of the Invention

The present invention relates to a depth measurement apparatus and, more particularly, to a depth measuring function used in a digital still camera and a digital video.

2. Description of the Related Art

In an auto focus (AF) use of a digital still camera or a digital video camera, there is known a method of acquiring parallax images having a parallax and performing stereo depth measurement. Optical images (hereinafter respectively referred to as "A image" and "B image" and collectively referred to as "AB images") generated by light beams passed through different pupil regions are acquired. An image shift amount (also referred to as parallax), which is a relative positional shift amount of the A image and the B image, is calculated to perform depth measurement.

When the depth measurement is performed, if a target object is an object simultaneously including a distant place and a near place, a correspondence between the image shift amount and perspective is unclear. Therefore, an accurate depth measurement calculation cannot be performed. Concerning an object having a periodical pattern, a plurality of solutions of the image shift amount are obtained. Therefore, an accurate depth measurement calculation cannot be performed.

For these objects that a depth measurement apparatus cannot successfully deal with, Japanese Patent Application Laid-Open No. 2011-007867 adopts a step of determining whether a pattern is a perspective pattern according to pattern matching of an object image and discloses a method of changing, according to a pattern of an object, a pixel region where a depth measurement calculation is performed. Japanese Patent Application Laid-Open No. 2008-304808 discloses a method of setting three or more pupil regions with respect to a periodical pattern to reduce a detection angle and calculating a depth using an image shift amount combined in a later stage.

Japanese Patent Application Laid-Open No. 2011-007867 discloses a method of dividing a pixel region of a sensor for acquiring parallax images into a plurality of blocks and changing setting to calculate respective defocus amounts of conflict objects. However, a specific determination method for setting of the sensor pixel region is not disclosed. There remains possibility that a defocus amount of a perspective pattern cannot be separated even after the setting change. For improvement of accuracy, repeated setting change is necessary. It is difficult to perform quick and highly-accurate depth measurement.

Japanese Patent Application Laid-Open No. 2008-304808 discloses a method of dividing a pupil region into three or more regions and setting the regions and calculating an image shift amount of the regions to exclude false focusing due to a periodical pattern. However, a specific determination method for a division setting value for the pupil region is not disclosed. There remains possibility that the false focusing due to the periodical pattern cannot be excluded. For improvement of accuracy, repeated change of the division setting value is necessary. It is difficult to perform quick and highly-accurate depth measurement.

SUMMARY OF THE INVENTION

The present invention has been devised to solve the problems of the related art and it is an object of the present invention to provide a depth measurement technique capable of quickly and highly accurately performing depth measurement.

The first aspect of the present invention is a depth measurement apparatus comprising: an image signal acquisition unit configured to acquire a first image signal from a first viewpoint and a second image signal from a second viewpoint; a correlation value acquisition unit configured to calculate, with respect to a plurality of shift amounts, a correlation value between the first image signal in a depth detection region and the second image signal in a region obtained by shifting the depth detection region; a provisional shift amount acquisition unit configured to acquire a plurality of provisional shift amounts on the basis of the correlation value; an image restoration unit configured to subject, for each of the plurality of provisional shift amounts, at least one of the first image signal and the second image signal to image restoration using an image restoration filter corresponding to each of the plurality of provisional shift amounts; a contrast analysis unit configured to analyze a contrast change resulting from image restoration processing by the image restoration unit; and a depth determination unit configured to determine depths with respect to a plurality of pixels in the depth detection region on the basis of a result of contrast analysis by the contrast analysis unit, wherein the provisional shift amount acquisition unit determines a first shift amount at which an extreme value of the correlation value is given, divides a first range, which is a range of a predetermined shift amount including the first shift amount, into a plurality of second ranges in order to acquire a provisional shift amount for each of the second ranges.

The second aspect of the present invention is a control method for a depth measurement apparatus, the method comprising: acquiring a first image signal from a first viewpoint and a second image signal from a second viewpoint; calculating, with respect to a plurality of shift amounts, a correlation value between the first image signal in a depth detection region and the second image signal in a region obtained by shifting the depth detection region; acquiring a plurality of provisional shift amounts on the basis of the correlation value; subjecting, for each of the plurality of provisional shift amounts, at least one of the first image signal and the second image signal to image restoration using an image restoration filter corresponding to each of the plurality of provisional shift amounts; analyzing a contrast change resulting from image restoration processing in the subjecting at least one of the first image signal and the second image signal to image restoration; and determining depths of a plurality of pixels in the depth detection region on the basis of a result of contrast analysis in the analyzing the contrast change, wherein the acquiring a plurality of provisional shift amount includes determining a first shift amount at which an extreme value of the correlation value is given, dividing a first range, which is a range of a predetermined shift amount including the first shift amount, into a plurality of second ranges, and acquiring a provisional shift amount for each of the second ranges.

According to the present invention, it is possible to perform quick and highly-accurate depth measurement when, in particular, the depth measurement is applied to an object having a periodical pattern and an object including perspective.

Further features of the present invention will become apparent from the following description of exemplary embodiments with reference to the attached drawings.

DESCRIPTION OF THE EMBODIMENTS

Figure 1:
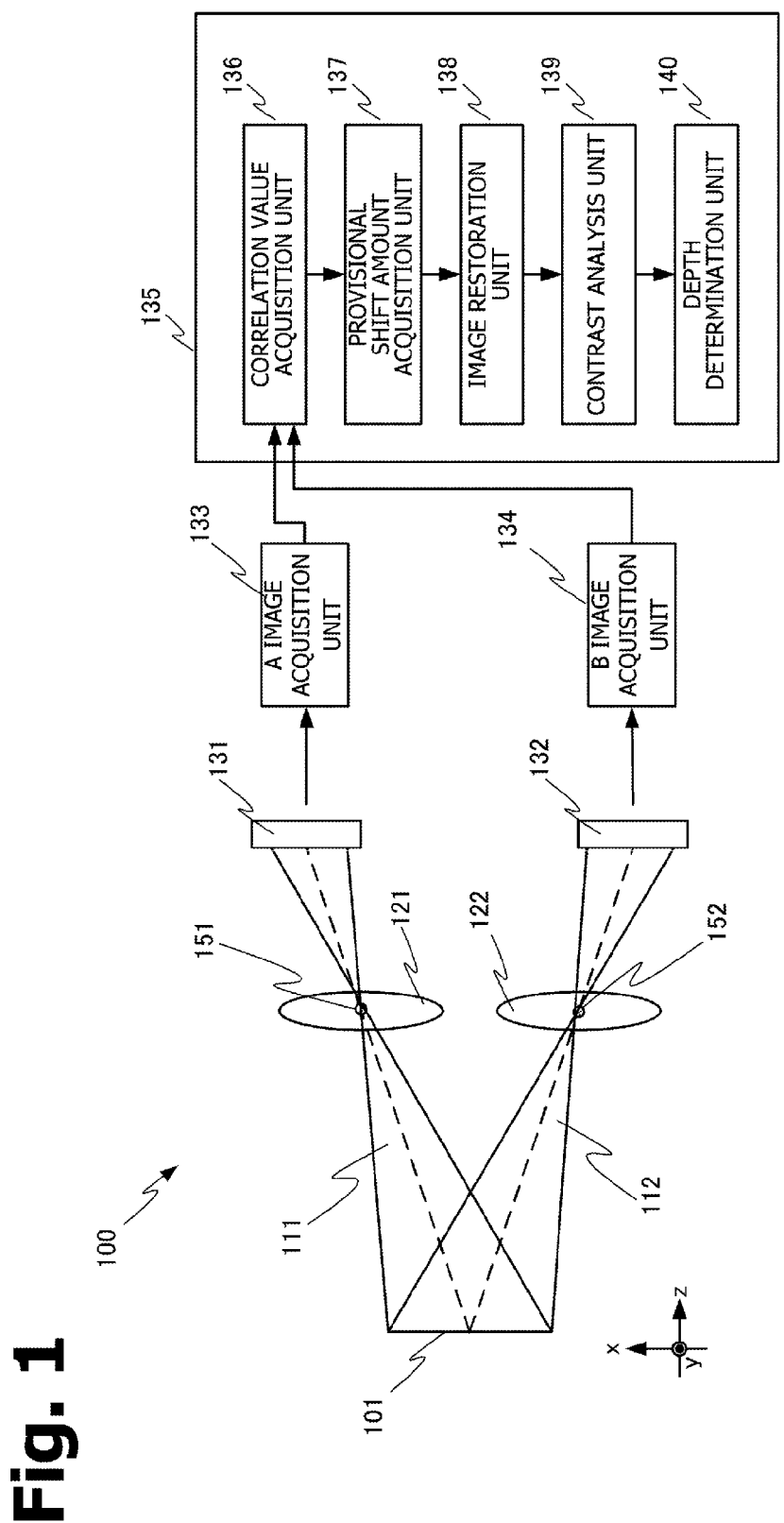
FIG. 1 is a diagram showing the configuration of a depth measurement apparatus according to an embodiment.

A depth measurement apparatus in an embodiment of the present invention is explained below with reference to the drawings. In all the drawings, components having the same functions are denoted by the same reference numerals and repeated explanation of the components is omitted.

Figure 17A:
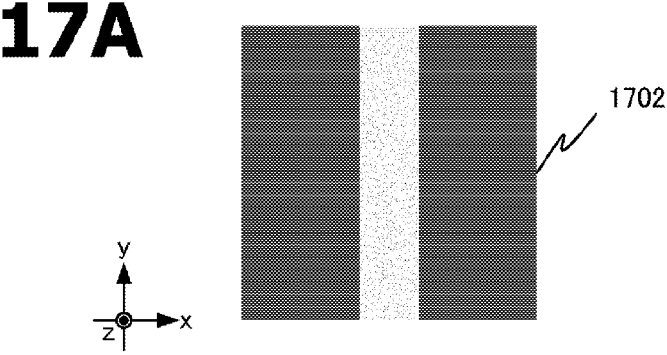
FIGS. 17A to 17C are diagrams for explaining a method of stereo depth measurement.
Figure 17B:
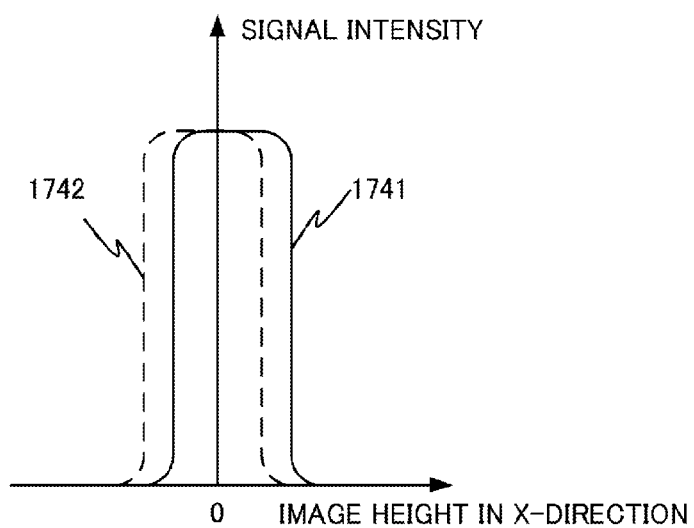
Figure 17C:
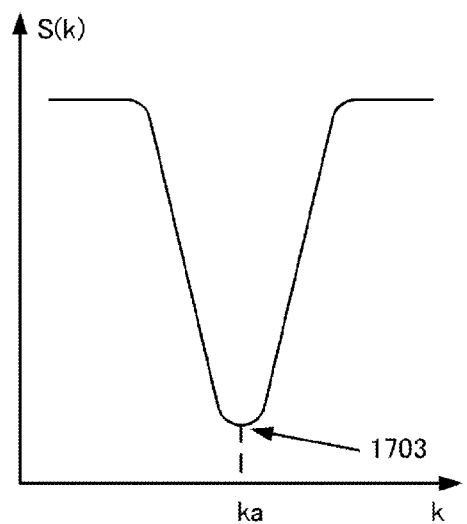

Before the explanation of this embodiment, a general method for stereo depth measurement is briefly explained. Two image signals having a parallax are acquired concerning an object. In the following explanation, the two images are referred to as "A image" and "B image". For example, when an object 1702 having a distribution of light and shade only in an x direction is present as shown in FIG. 17A, an A image 1741 and a B image 1742 having a parallax can be acquired as shown in FIG. 17B.

In order to calculate the depth of the object 1702, a parallax (also referred to as an image shift amount) between the A image and the B image is calculated. A correlation operation of the A image and the B image is performed for calculation of the image shift amount. A publicly-known method can be used for the correlation operation. For example, a correlation value S(k) is calculated using Expression 1 below.

[Math. 1]

$$S(k) = \sum_{i=1}^{n} |A(i+k) - B(i)| \quad \text{Expression 1}$$

A(i) and B(i) represent signal intensities of the A image and the B image in a pixel region [i]. An image shift amount is calculated from k at which the correlation value S(k) takes a minimal value 1703. The pixel region [i] is set to include the A image and the B image and is determined as appropriate in view of calculation accuracy of the image shift amount.

The principle of triangulation is applied to the image shift amount calculated as explained above and a base line length between viewpoints to calculate the depth of the object.

Figure 3A:
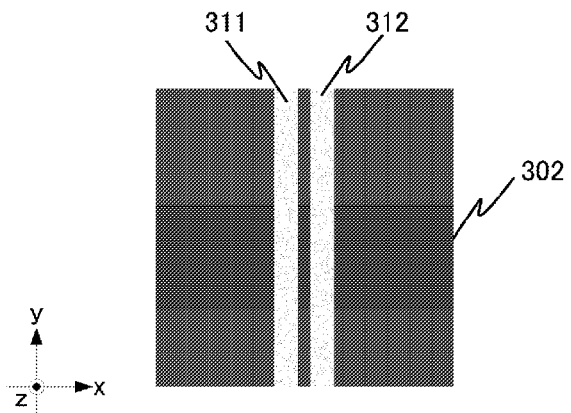
FIGS. 3A to 3C are diagrams for explaining depth measurement with respect to a near object (a first embodiment)
Figure 3B:
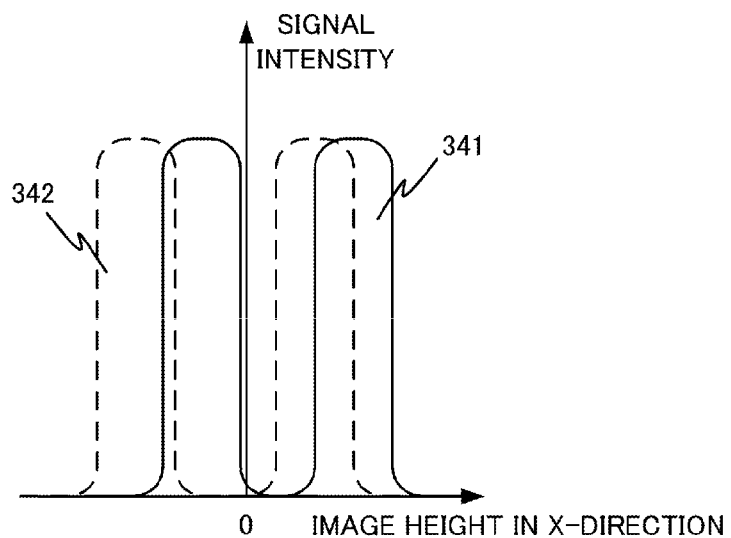

In the general stereo depth measurement explained above, in some cases, depth measurement cannot be accurately performed depending on an object. For example, when objects at different depths are close to each other, accurate measurement cannot be performed. It is assumed that an object pattern 302 including an object 311 and an object 312 shown in FIG. 3A is present. The object pattern 302 includes the object 311 and the object 312 having light and shade in the x direction. The object 311 and the object 312 are close to each other in the x direction and present in different coordinates in a z direction. FIG. 3B shows an A image 341 and a B image 342 obtained when the object pattern 302 is photographed by a stereo camera.

Figure 3C:
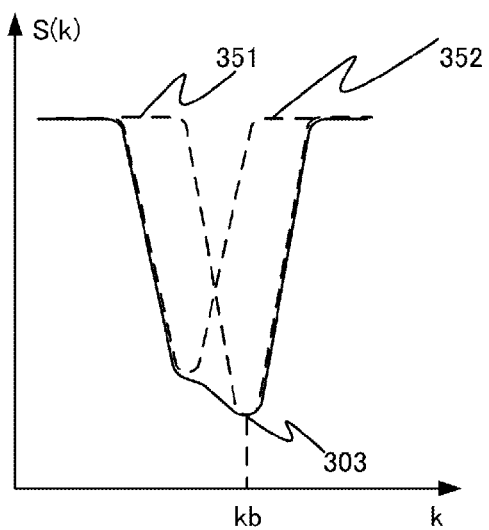

A result of a correlation value calculation with respect to the A image 341 and the B image 342 is shown in FIG. 3C. When only the object 311 is included in a depth measurement region, the correlation value S(k) of the object 311 is as indicated by a dotted line 351. Similarly, when only the object 312 is included in the depth measurement region, the correlation value S(k) of the object 312 is as indicated by a dotted line 352. However, when the object 311 and the object 312 are present in the depth measurement region, a correlation value indicated by a solid line 303 is obtained. This is because, since the object 311 and the object 312 are close to each other in the x direction, minimums of the correlation values of the objects 311 and 312 indicated by the dotted lines are buried by mutual action of the objects 311 and 312.

If the objects are close to each other and the minimums of the correlation values are buried, one depth is calculated for objects that are actually at different depths. That is, accurate depth measurement cannot be carried out.

First Embodiment

Configuration

FIG. 1 shows the configuration of a stereo photographing apparatus (a depth measurement apparatus) 100 according to a first embodiment. The stereo photographing apparatus 100 acquires a first image signal (an A image) at a first viewpoint and a second image signal (a B image) at a second viewpoint having a parallax and calculates the depth of an object on the basis of the parallax between the A image and the B image.

The stereo photographing apparatus 100 includes imaging optical systems 121 and 122, photodetector arrays 131 and 132, an A image signal acquisition unit 133, a B image signal acquisition unit 134, and a depth calculation unit 135. The imaging optical systems 121 and 122 are configured by one or a plurality of optical elements. The imaging optical systems 121 and 122 respectively form images (an A image and a B image) from a first viewpoint 151 and a second viewpoint 152 on the photodetector arrays 131 and 132. The photodetector unit arrays 131 and 132 are configured by a plurality of photodetectors. The photodetector arrays 131 and 132 respectively output image signals at the first and second viewpoints. In the following explanation, a signal output by the photodetector array 131 is also referred to as first image signal and a signal output by the photodetector array 132 is also referred to as second image signal. The A image signal acquisition unit 133 acquires the first image signal from the photodetector array 131 and outputs the first image signal to the depth calculation unit 135. The B image signal acquisition unit 134 acquires the second image signal from the photodetector array 132 and outputs the second image signal to the depth calculation unit 135. The depth calculation unit 135 calculates the depth of an object on the basis of the first and second image signals. The depth calculation unit 135 includes a microprocessor such as a DSP and a memory. The microprocessor executes computer programs stored in the memory, whereby functions of a correlation value acquisition unit 136, a provisional shift amount acquisition unit 137, an image restoration unit 138, a contrast analysis unit 139, and a depth determination unit 140 are realized. These functional units may be implemented by a dedicated hardware circuit such as an ASIC or may be implemented by a combination of software and hardware.

<Processing>

Figure 2:
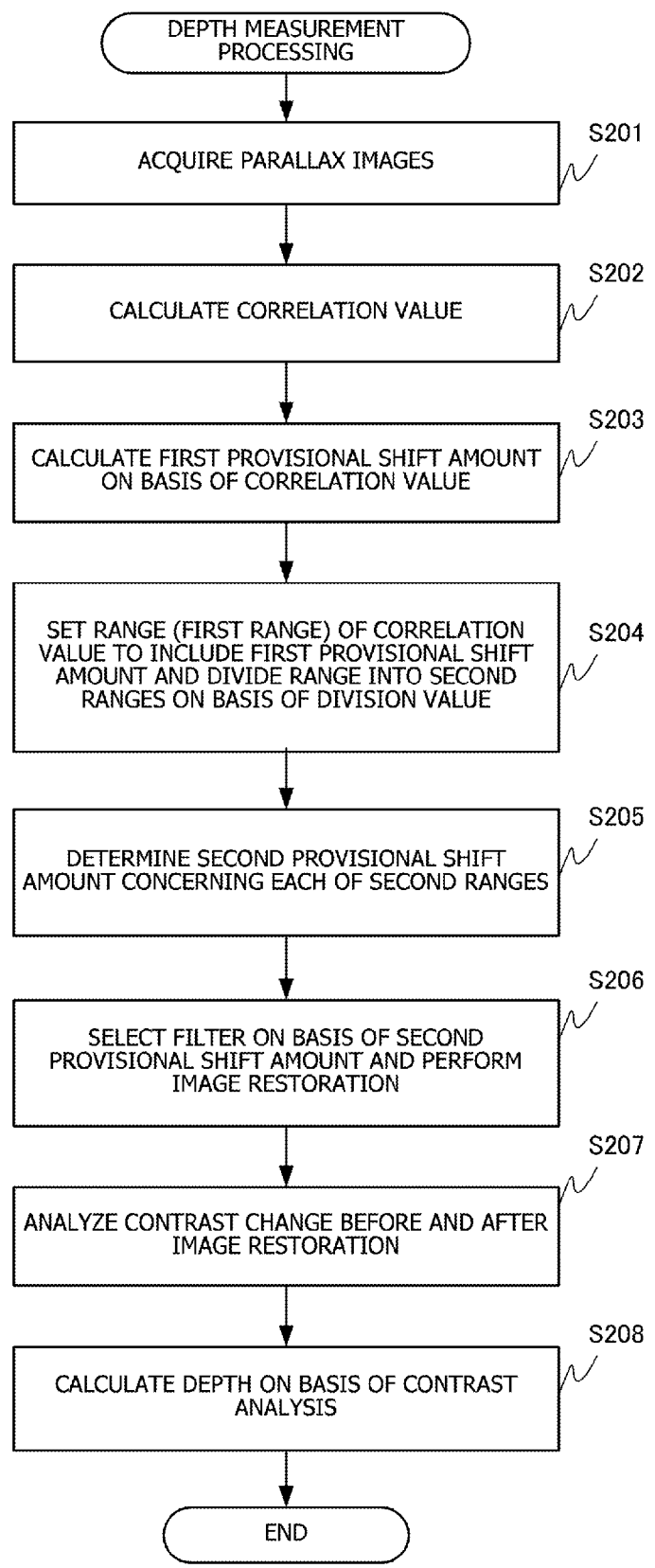
FIG. 2 is a flowchart for explaining processing of the depth measurement apparatus according to the embodiment.

FIG. 2 is a flowchart for explaining a flow of control of depth measurement processing executed by the stereo photographing apparatus 100 according to this embodiment. Stereo depth measurement performed by the stereo photographing apparatus 100 is explained below according to the flowchart of FIG. 2.

<Acquisition of Stereo Parallax Images and a Correlation Value Calculation>

In step S201, the stereo photographing apparatus 100 acquires two images, i.e., an A image and a B image having a parallax. A first light beam 111 emitted from an object surface 101 is imaged on the photodetector array 131 via the imaging optical system 121 and forms a first image signal (an A image) at the first viewpoint 151. Similarly, a second light beam 112 emitted from the object surface 101 is imaged on the photodetector array 132 via the imaging optical system 122 and forms a second image signal (a B image) at the second viewpoint 152. The A image signal acquisition unit 133 reads out the first image signal on the photodetector array 131. The B image signal acquisition unit 134 reads out the second image signal on the photodetector array 132. The signals are input to the depth calculation unit 135.

In an example explained below, an object 302 having a distribution of light and shade only in an x direction shown in FIG. 3A is present on the object surface 101. It should be noted that depth measurement processing according to this embodiment is effective not only in the case of a specific object shown in FIG. 3A and but also for an arbitrary object. When the object 302 shown in FIG. 3A is photographed, an A image 341 and a B image 342 having a parallax is acquired as shown in FIG. 3B.

In step S202, the correlation value acquisition unit 136 applies a correlation operation to the A image 341 and the B image 342. That is, the correlation value acquisition unit 136 calculates, with respect to a plurality of shift amounts, a correlation value between an A image in a depth detection region and a B image in a region obtained by shifting the depth detection region a predetermined amount. The depth detection region is a region having a predetermined size and only has to be determined as appropriate taking into account calculation accuracy of an image shift amount and processing speed.

As the correlation value, an arbitrary correlation value can be adopted as long as the correlation value is an index representing similarity between the images. For example, a correlation value S(k) represented by Expression 1 below can be adopted.

[Math. 2]

$$S(k) = \sum_{i=1}^{n} |A(i+k) - B(i)|$$ Expression 1 where, A(i) and B(i) represent signal intensities of the A image and the B image in a pixel region [i].

When the correlation value S(k) indicated by Expression 1 is adopted, as the correlation value S(k) is smaller, correlation between the images is higher. FIG. 3C shows a result of a correlation operation with respect to the A image 341 and the B image 342 shown in FIG. 3B. Minimums of the correlation values 351 and 352 of respective objects 311 and 312 are buried by mutual action of the objects 311 and 312. A correlation value for each of shift amounts is as indicated by a solid line 303.

<Calculation of a Provisional Image Shift Amount>

In steps S203 to S205, the provisional shift amount acquisition unit 137 acquires a plurality of provisional shift amounts (provisional image shift amounts). In step S203, the provisional shift amount acquisition unit 137 acquires a first provisional shift amount on the basis of a result of the correlation value calculation. Specifically, the provisional shift amount acquisition unit 137 determines, as the first provisional shift amount, a shift amount at which the correlation value S(k) gives a minimal value (a shift amount at which correlation is maximum). When the result of the correlation value calculation is a result shown in FIG. 3C, k=kb at which the correlation value S(k) takes a minimal value is determined as the first provisional shift amount.

Subsequently, the provisional shift amount acquisition unit 137 determines a plurality of second provisional shift amounts on the basis of the result of the correlation value calculation and the first provisional shift amount. More specifically, in step S204, the provisional shift amount acquisition unit 137 determines a range (a first range) of the shift amount k to include the first provisional shift amount and divides the range into a plurality of second ranges. In step S205, the provisional shift amount acquisition unit 137 determines the second provisional shift amounts with respect to the second ranges.

Figure 4:
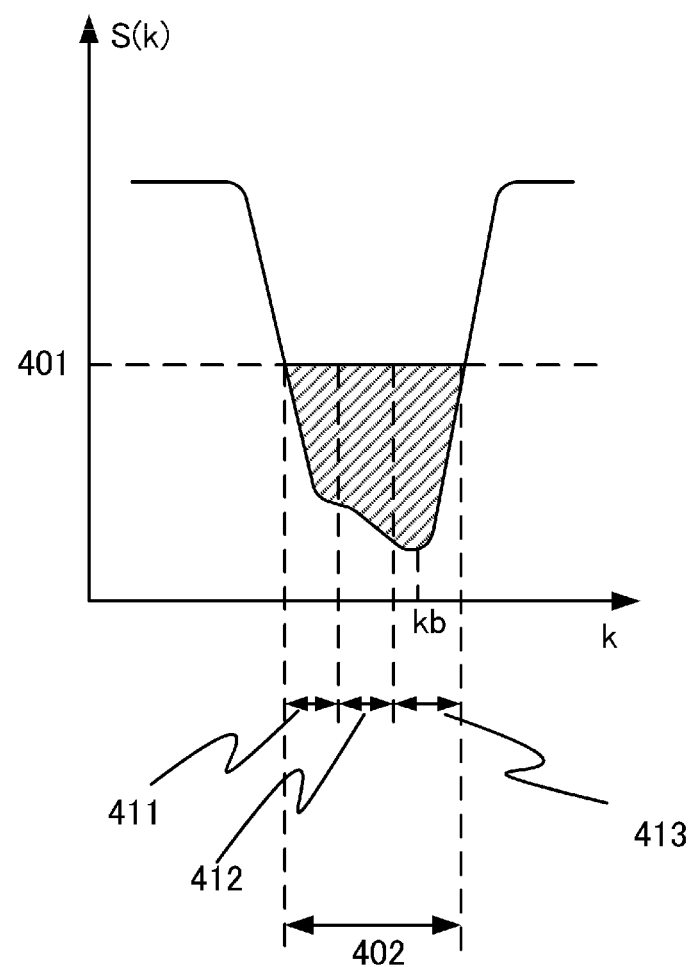
FIG. 4 is a diagram for explaining a determination method for a provisional shift amount (the first embodiment)

The determination of the shift amounts is specifically explained with reference to FIG. 4. In FIG. 4, kb represents the first provisional shift amounts. The provisional shift amount acquisition unit 137 determines a first range 402 as a range of the shift amount k that includes the first provisional shift amount kb and at which the correlation value S(k) is equal to or smaller than a threshold 401. The threshold 401 is determined on the basis of depth measurement calculation accuracy determined from an imaging optical system, a value of a base line length, and contrast and brightness of an object image signal. The provisional shift amount acquisition unit 137 divides the first range 402 into a plurality of second ranges 411, 412, and 413 on the basis of a set division value. In this embodiment, the provisional shift amount acquisition unit 137 equally divides the first range 402 and obtains the second ranges 411, 412, and 413. In the embodiment, the division value is set to "3". However, the division value only has to be set as appropriate in view of accuracy and a load of computational complexity. The provisional shift amount acquisition unit 137 determines medians of regions 311 to 313 as second provisional shift amounts k1, k2, and k3.

<Image Restoration, Contrast Analysis, and Determination of a Depth>

In step S206, the image restoration unit 138 carries out image restoration processing using image restoration filters corresponding to the second provisional shift amounts k1, k2, and k3. Specifically, the image restoration unit 138 calculates, using a publicly-known method, depths L1, L2, and L3 respectively corresponding to the second provisional shift amounts k1, k2, and k3. The image restoration unit 138 selects optimum image restoration filters used in image restoration on the basis of the calculated depths L1 to L3. The image restoration unit 138 only has to perform the image restoration according to a publicly-known method. For example, the image restoration unit 138 performs the image restoration by subjecting point image distribution functions corresponding to the depths L1, L2, and L3 to Fourier transform, adopting, as the image restoration filters, functions obtained by subjecting inverses of functions obtained by the Fourier transform to inverse Fourier transform, and applying a convolutional operation to the A image 341. The image restoration unit 138 only has to apply the image restoration processing to at least one of the A image and the B image.

The image restoration filters are determined according to the depths (L1, L2, and L3). However, since the depths are determined according to the second provisional shift amounts (k1, k2, and k3), the image restoration filters can also be expressed as being determined according to the second provisional shift amounts.

Figure 5A:
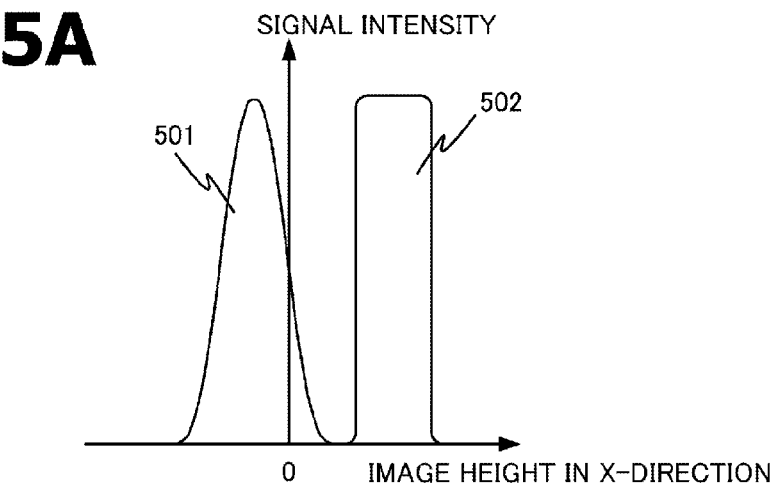
FIGS. 5A to 5C are diagrams showing a contrast change after image restoration processing (the first embodiment)
Figure 5B:
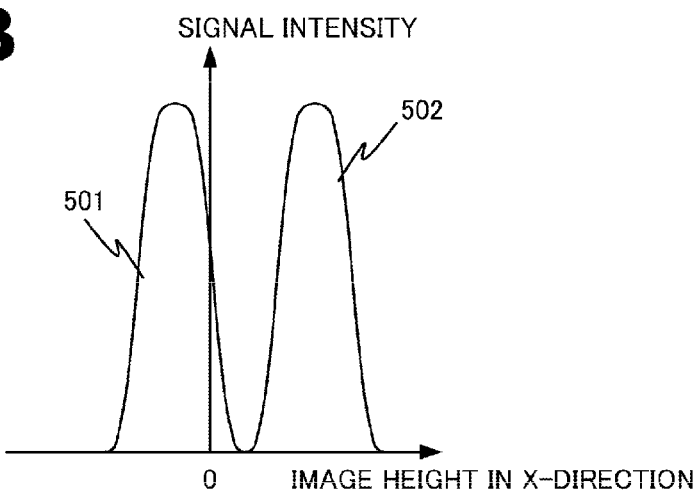
Figure 5C:
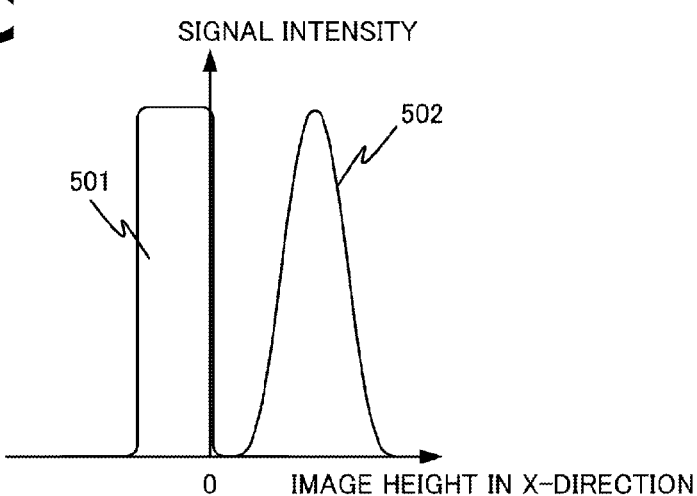

FIGS. 5A to 5C show results obtained by performing the image restoration. FIG. 5A shows a result obtained by applying the image restoration to the A image 341 using the image restoration filter corresponding to the depth L1. Similarly, FIG. 5B shows a result of the image restoration by the image restoration filter corresponding to the depth L2 and FIG. 5C shows a result of the image restoration by the image restoration filter corresponding to the depth L3.

The optimum image restoration filters are different depending on a defocus amount from a focus surface. Therefore, when appropriate filters are selected with respect to the position of the object, contrast after the image restoration is high. Conversely, when inappropriate filters are selected, contrast after the image restoration is low.

Therefore, in step S207, in order to determine correctness of the image restoration filters and moreover correctness of the calculated depths, the contrast analysis unit 139 analyzes a contrast change of an image signal due to the image restoration. The contrast analysis unit 139 analyzes a change in contrast due to the image restoration processing for each of objects in the depth detection region. The change in contrast can be acquired by differentiating the image signal and determining a change in a tilt (sharpness) of an edge portion of the image signal before and after the image restoration processing.

As shown in FIG. 5A, an object image signal 502 has the highest contrast through the image restoration by the filter corresponding to the depth L1. As shown in FIG. 5C, an object image signal 501 has the highest contrast through the image restoration by the filter corresponding to the depth L3.

In step S208, the depth determination unit 140 determines the depth of each of the objects on the basis of a result of the contrast analysis. As shown in FIG. 5A, the contrast of the object image signal 502 is the highest through the image restoration processing by the filter corresponding to the depth L1. Therefore, the depth of the object 312 is determined as L1. Similarly, as shown in FIG. 5C, the contrast of the object image signal 501 is the highest through the image restoration processing by the filter corresponding to the depth L3. Therefore, the depth of the object 311 is determined as L3. The depth determination unit 140 determines depth of each of the objects. However, it is unnecessary to determine which pixel corresponds to which object. That is, the depth determination unit 140 only has to determine a depth for each of predetermined sub-regions in the depth detection region on the basis of a contrast change before and after the image restoration processing by the filters.

As explained above, according to this embodiment, it is possible to perform a depth measurement operation even when signals are buried by mutual action and an accurate image shift amount (shift amount) cannot be calculated in a result of the correlation operation.

<Modifications>

Figure 6:
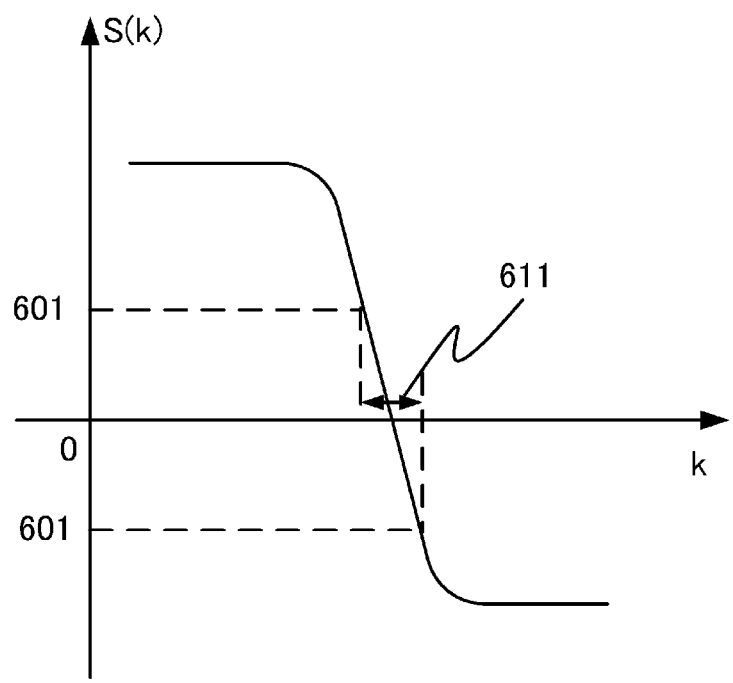
FIG. 6 is a diagram for explaining a modification of the determination method for a provisional shift amount.

In the correlation operation in step S202, the index shown in Expression 1 is used as the correlation value. However, the correlation operation does not need to be limited to this method. A correlation value that takes a positive extreme value may be adopted. In this case, a value of k at which the correlation value takes a maximal value (a maximum value) only has to determine as the first provisional shift amount. A correlation value that takes positive and negative values and a zero value of which represents highest correlation may be adopted. A determination method for the first and second provisional shift amounts in this case is explained with reference to FIG. 6. The first provisional shift amount is determined as the value k to which a zero point is given. A first range 611 is determined by a threshold 601 (values (absolute values) of which on a plus side and a minus side may be the same or may be different). The first range 611 is divided to determine second ranges. The second provisional shift amounts are calculated for the ranges.

The provisional shift amount acquisition unit only has to be a unit configured to calculate a relative positional shift amount (displacement amount) between the A image and the B image. Besides the method of shifting the depth detection region in the real space, the relative positional shift amount may be calculated by a calculation method in a phase space using Fourier transform. This is suitable in that it is possible to improve calculation accuracy of a provisional shift amount.

In the above explanation, the first range is equally divided to obtain the second ranges. However, the first range does not always need to be equally divided and may be unequally divided. The medians of the second ranges are set as the second provisional shift amounts concerning the ranges. However, values other than the medians may be set as the second provisional shift amounts. For example, shift amounts at which averages (or medians) of correlation values in the second ranges are given may be determined as the second provisional shift amounts. Alternatively, upper limits or lower limits in the second ranges or predetermined values other than the medians may be determined as the second provisional shift amounts.

As the filters used for the image restoration, filters stored in advance may be used. Alternatively, the filters may be calculated every time the filters are used. A method of selecting filters from a list stored in advance is suitable for a purpose of reducing a load of computational complexity. A method of calculating image restoration filters on the basis of optical information of an imaging optical system is suitable in that it is possible to improve accuracy of the image restoration and moreover improve depth measurement accuracy. As the image restoration filters, image restoration filters generated on the basis of a point spread function or a line spread function can be used. It is suitable to generate the image restoration filters on the basis of the point spread function in that it is possible to perform highly accurate image restoration. It is suitable to generate the image restoration filters on the basis of the line spread functions in that it is possible to attain an increase in speed of calculation while securing accuracy when an object has contrast in only one axial direction. It is also suitable to use the image restoration filters generated using a method of a Wiener filter in that it is possible to obtain an effect of suppressing the influence of a noise component during image restoration. It is also suitable to use means for performing the image restoration by convoluting a point spread function or a line spread function of the A image in the B image (or convoluting a point spread function or a line spread function of the B image in the A image) in that it is possible to suppress computational complexity.

The image restoration processing may be applied to only one of the A image and the B image or may be applied to both of the A image and the B image. It is suitable to apply the image restoration to only one of the A image and the B image and perform the contrast analysis in that it is possible to reduce a load of computational complexity. It is suitable to apply the image restoration to both of the A image and the B image and perform the contrast analysis in that it is possible to improve depth measurement accuracy.

It is suitable to adapt the contrast analysis to detect a change in contrast before and after the image restoration processing using an image signal before the image restoration as well in that it is possible to improve accuracy of depth measurement.

In order to analyze a change in contrast, besides determining a change in sharpness, for example, a change in ringing may be determined. It is suitable to perform the contrast analysis according to comparison of a sharpness change using integral or differential between image signals because it is possible to accurately determine a depth while preventing an increase in computational complexity. It is suitable to perform the contrast analysis by comparing a change in ringing for detecting an increase in a high-frequency component of an object image signal because it is possible to perform more highly accurate depth calculation.

In the example explained above, the depth calculation is performed for one depth detection region. However, it is possible to measure depths for an entire image by repeating the processing explained above while changing the depth detection region.

In this embodiment, the stereo depth measurement apparatus (the depth measurement apparatus) includes the imaging optical system and the imaging element and performs depth measurement on the basis of an image photographed by the stereo depth measurement apparatus. However, an acquisition method for a depth measurement target image may be arbitrary. For example, it is also possible to acquire parallax images stored in the memory and perform a depth measurement operation on the basis of the parallax images. It is also possible to acquire parallax images through a network and perform the depth measurement operation.

Second Embodiment

According to a second embodiment, there is provided a stereo photographing apparatus (a depth measurement apparatus) suitably applicable when a correlation value obtained from parallax images has a plurality of extreme values. The configuration of the stereo photographing apparatus according to this embodiment is the same as the configuration in the first embodiment (FIG. 1) and the modifications of the first embodiment. Therefore, explanation of the configuration is omitted. Compared with the first embodiment and the like, processing contents of the provisional shift amount acquisition unit 137 and the depth determination unit 140 are different. Therefore, processing by these functional units is mainly explained.

Figure 8A:
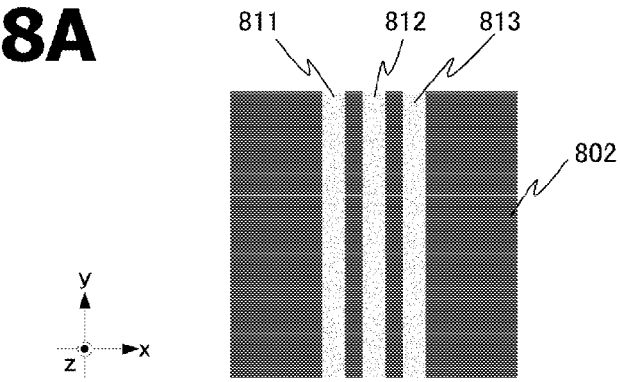
FIGS. 8A to 8C are diagrams for explaining depth measurement with respect to a periodical object (the second embodiment)
Figure 8B:
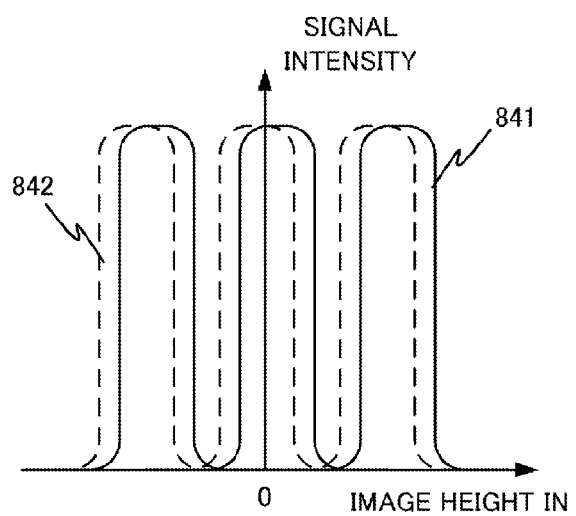
Figure 8C:
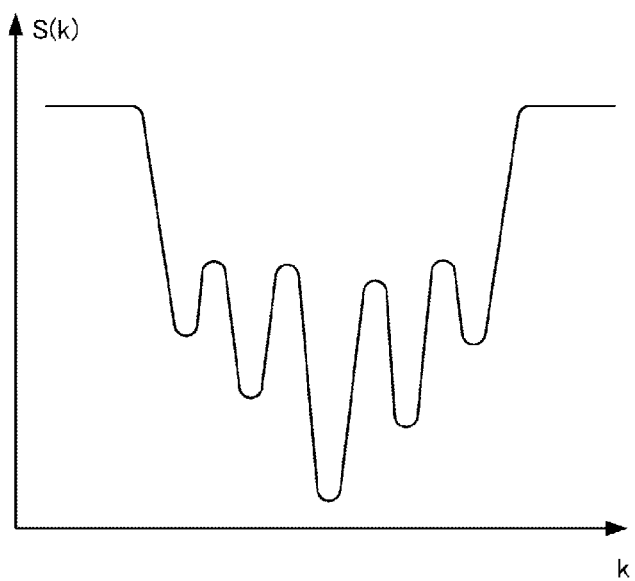

An object pattern 802 shown in FIG. 8A is photographed by a stereo photographing apparatus 100 according to this embodiment. The object pattern 802 includes objects 811, 812, and 813 having light and shade in the x direction. The objects 811, 812, and 813 are close to one another in the x direction and present in the same coordinate in a z direction. That is, the object pattern 802 is an object pattern having a periodical shape in the x direction. FIG. 8B is a diagram showing an A image 841 (a solid line) and a B image 842 (a dotted line) to be photographed. When a correlation operation (step S202) same as the correlation operation in the first embodiment is applied to the A image 841 and the B image 842, a result shown in FIG. 8C is obtained. Since the objects of attention have a periodical pattern, a plurality of extreme values of a correlation value are present besides an image shift amount representing an original parallax.

Figure 9:
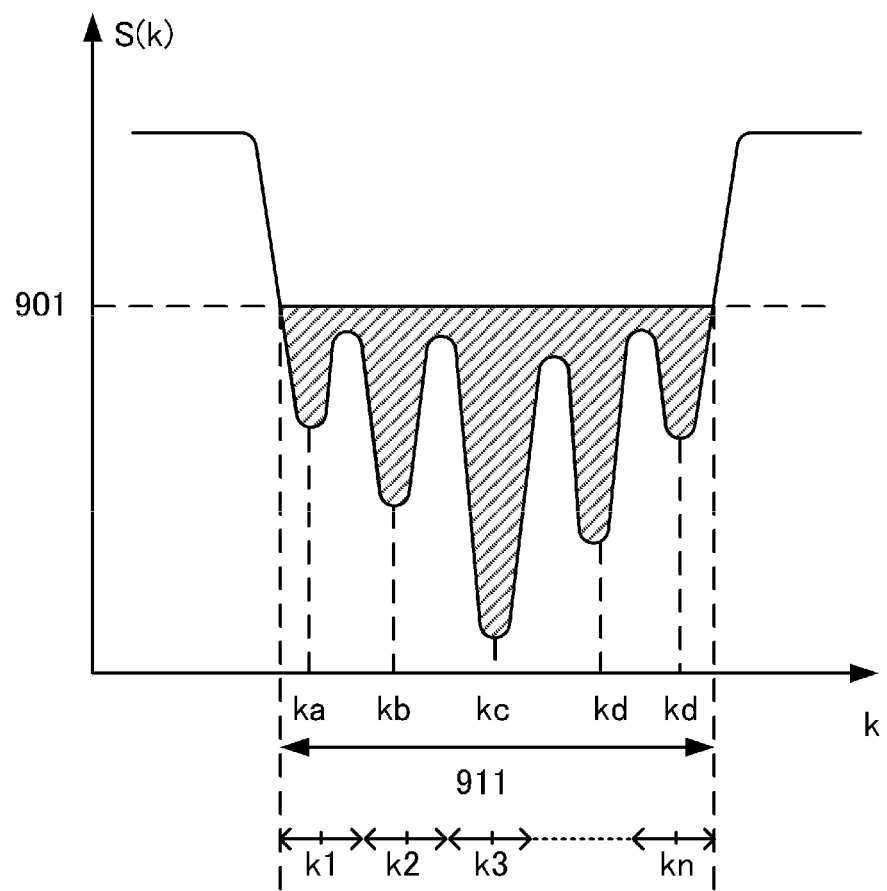
FIG. 9 is a diagram for explaining a determination method for a provisional shift amount (the second embodiment)

The provisional shift amount acquisition unit 137 determines, as first provisional shift amounts, a plurality of shift amounts at which a correlation value gives extreme values (step S203). In the example shown in FIG. 8C, since the correlation value has five extreme values, five first provisional shift amounts are acquired. As shown in FIG. 9, the provisional shift amount acquisition unit 137 determines a first range 911 that includes the five first provisional shift amounts and in which the correlation value is equal to or smaller than a threshold 901 and divides the first range 911 into second ranges according to a division value (step S204). The division value is represented as n (an integer equal to or larger than 2). The division value n may be a value set in advance or may be a value determined according to a first provisional shift amount to be acquired.

Figure 10A:
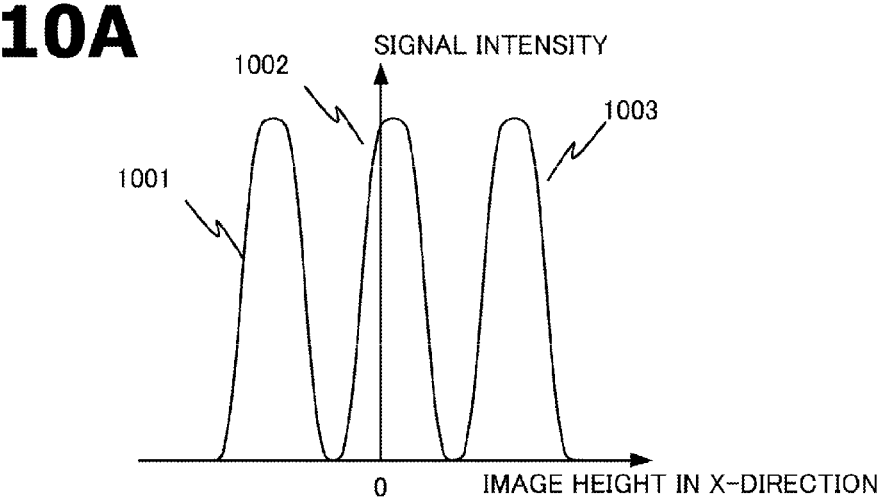
FIGS. 10A to 10C are diagrams showing a contrast change after image restoration processing (the second embodiment)
Figure 10B:
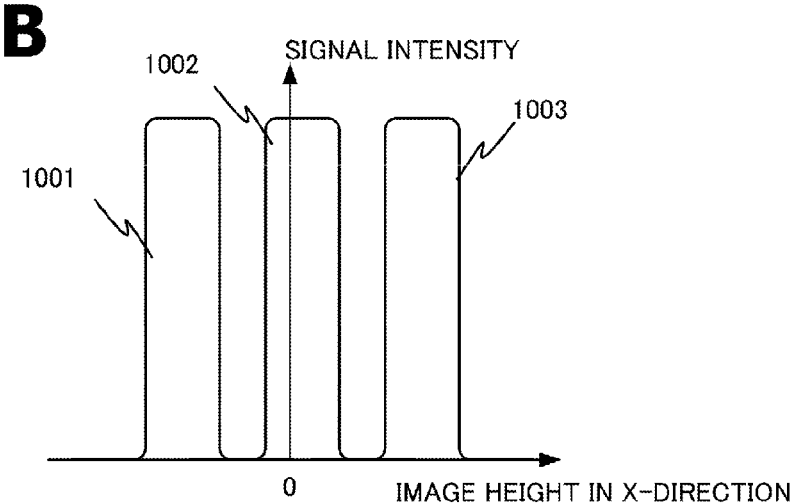
Figure 10C:
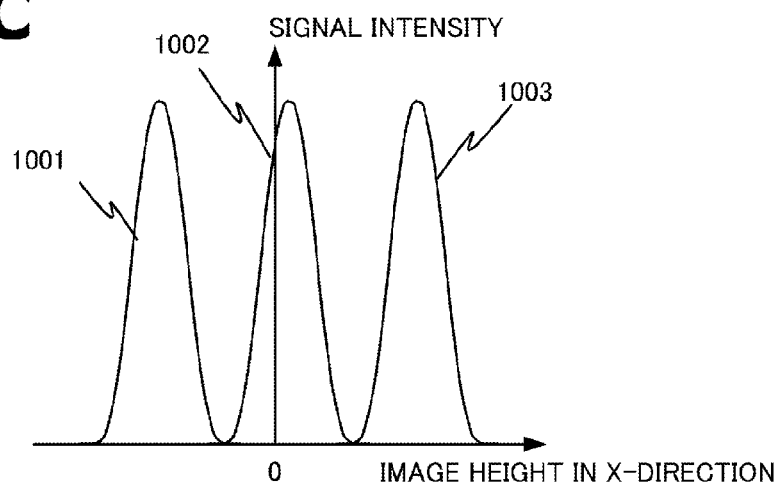

The provisional shift amount acquisition unit 137 determines medians k1 to kn of the second ranges as second provisional shift amounts (step S205). The image restoration unit 138 calculates provisional image shift amounts corresponding to k1 to kn and performs image restoration of an object image signal using image restoration filters corresponding to depths L1 to Ln based on the provisional image shift amounts (step S206). FIGS. 10A to 10C show, in order, results obtained by subjecting the A image 841 to the image restoration using filters corresponding to depths Lb, Lc, and Ld based on kb, kc, and kd included in the first range 911. A signal 1001 corresponds to the object 811, a signal 1002 corresponds to the object 812, and a signal 1003 corresponds to the object 813. The contrast analysis unit 139 analyzes a change in contrast before and after the image restoration (S207).

Figure 7:
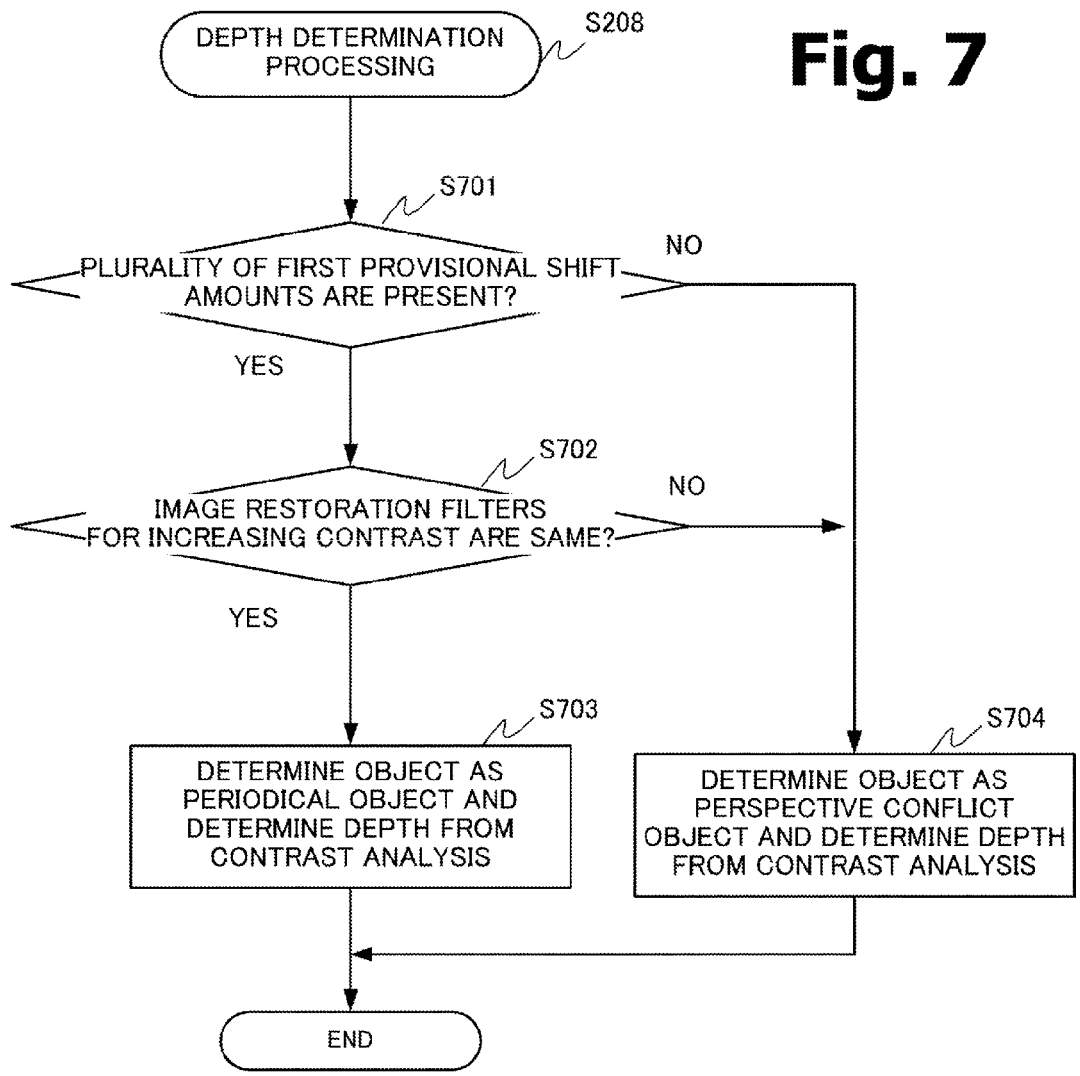
FIG. 7 is a flowchart for explaining details of depth determination processing (second and third embodiments)

The depth determination unit 140 determines depths of the objects on the basis of a result of the contrast analysis (S208). Detailed processing in this embodiment of depth determination processing performed by the depth determination unit 140 is shown in a flowchart of FIG. 7. First, the depth determination unit 140 determines whether a plurality of first provisional shift amounts determined in step S203 are present (S701). When a plurality of first provisional shift amounts are present (YES in S701) and image restoration filters for increasing contrast as a result of the image restoration are the same (YES in S702), the depth determination unit 140 can determine that the objects are periodical objects (S703). In the case of the object pattern 802, a result of the image restoration is as shown in FIGS. 10A to 10C. When the image restoration filter corresponding to the depth Lc is used, contrasts of the signals 1001 to 1003 are simultaneously the highest. On the other hand, when the image restoration filters corresponding to the other depths are used, contrasts are not so high. Therefore, the depth determination unit 140 can determine that the object pattern 802 is an object having a periodical pattern and determine one depth Lc concerning all the objects in the depth measurement region.

When depth measurement for the objects having the periodical pattern is performed in this way, a depth measurement operation can be performed even when an accurate depth cannot be calculated from a result of a correlation operation.

Further, it is also preferable to perform the correlation operation again using the image signals with improved contrasts after the image restoration processing and perform depth detection on the basis of an image shift amount at which maximum correlation is given. Since only objects at the same depth are present in the depth detection region, it is possible to perform accurate depth detection according to a depth measurement method same as the conventional depth measurement method. Since only the image signals with improved contrasts are used, accuracy of depth detection is improved.

Third Embodiment

Figure 11A:
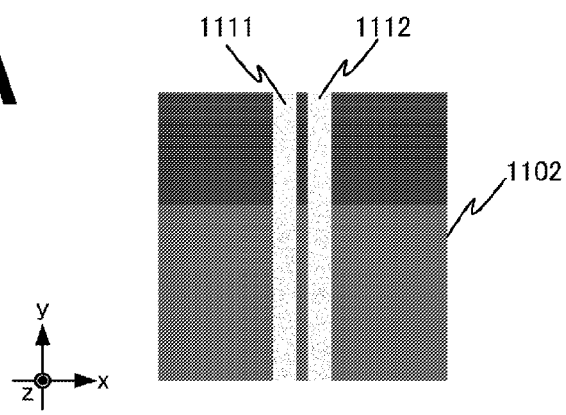
FIGS. 11A to 11C are diagrams for explaining depth measurement with respect to a perspective conflict object (the third embodiment)
Figure 11B:
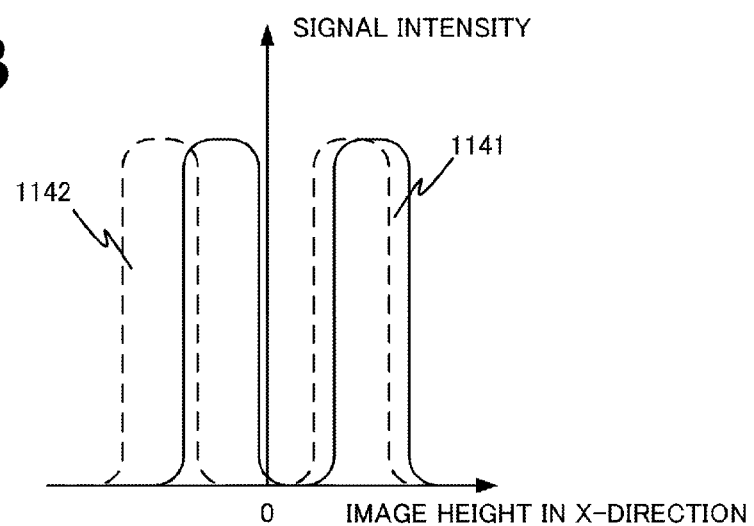
Figure 11C:
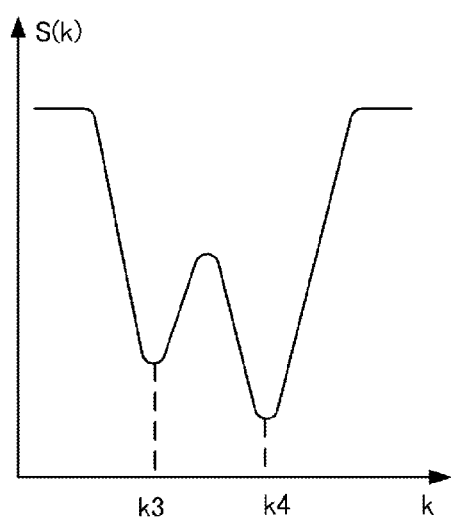

According to a third embodiment, there is provided the stereo photographing apparatus 100 same as the stereo photographing apparatus 100 in the second embodiment. Here, explanation is given about the stereo photographing apparatus 100 according to this embodiment that photographs an object pattern 1102 shown in FIG. 11A. The object pattern 1102 includes objects 1111 and 1112 having light and shade in the x direction. The objects 1111 and 1112 are present in different coordinates in the z direction. That is, the object pattern 1102 is an object pattern simultaneously having a distant place and a near place. FIG. 11B is a diagram showing an A image 1141 and a B image 1142 to be photographed. When a correlation operation (S202) same as the correlation operation in the first embodiment is applied to the A image 1141 and the B image 1142, a result shown in FIG. 11C is obtained. In the object pattern 1102, a depth between the objects is larger than the depth in the object pattern 302 shown in FIG. 3A. Therefore, two extreme values k3 and k4 are obtained.

The provisional shift amount acquisition unit 137 acquires, as first shift amounts, a plurality of shift amounts at which a correlation value gives extremely values (step S203). In an example shown in FIG. 11C, two shift amounts k3 and k4 are determined as the first shift amounts. At this point, since the objects of attention simultaneously include a distant place and a near place, it is impossible to discriminate which of values of k3 and k4 calculated from the correlation operation corresponds to a distant or near distance.

Figure 12:
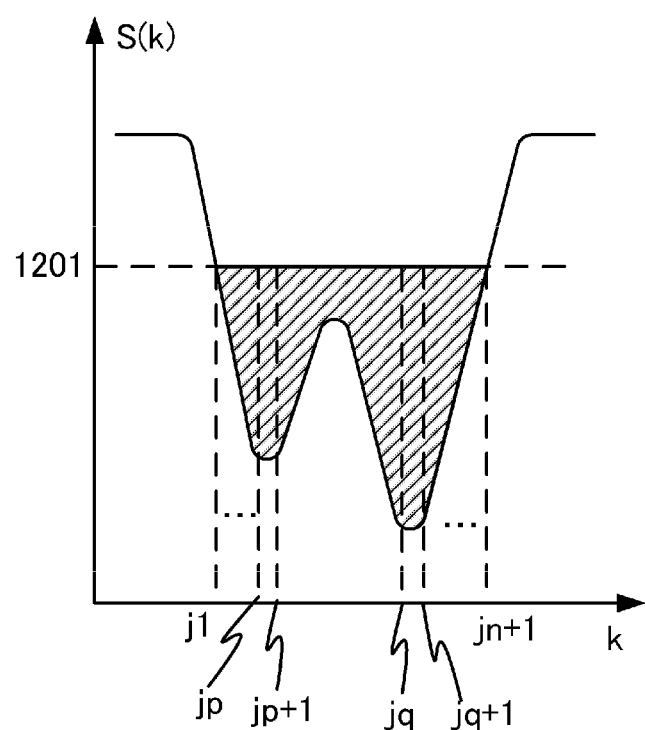
FIG. 12 is a diagram for explaining a determination method for a provisional shift amount (the third embodiment)

As shown in FIG. 12, the provisional shift amount acquisition unit 137 determines a first range that includes the first provisional shift amounts and in which the first provisional shift amounts are equal to or smaller than a threshold 1201. The provisional shift amount acquisition unit 137 divides the first range into second ranges according to a division value (step S204). The division value is represented as n (an integer equal to or larger than 2).

Figure 13A:
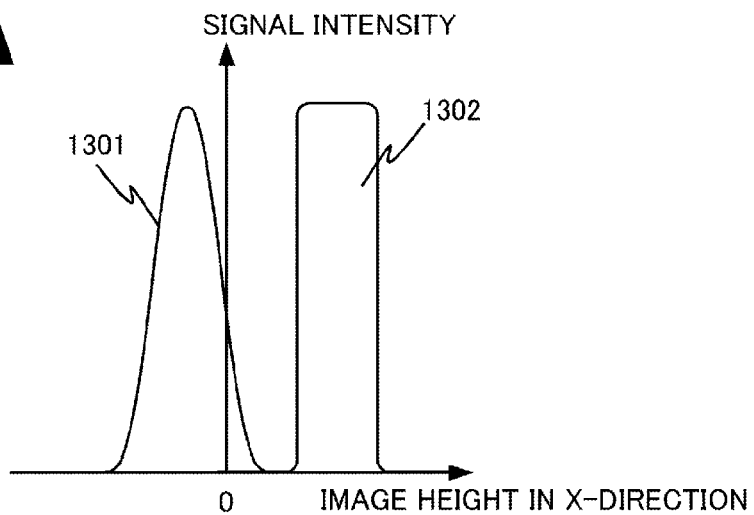
FIGS. 13A and 13B are diagrams showing a contrast change after image restoration processing (the third embodiment)

The provisional shift amount acquisition unit 137 determines medians k1 to kn in the second ranges as second provisional shift amounts (step S205). The image restoration unit 138 calculates provisional image shift amounts corresponding to k1 to kn and performs image restoration for the A image using image restoration filters corresponding to the depths L1 to Ln based on the provisional image shift amounts (S206). FIG. 13A shows a result of image restoration performed using a depth Lp corresponding to a provisional image shift amount based on kp in a range indicated by jp and jp+1. Similarly, FIG. 11B shows a result of image restoration performed using a depth Lq corresponding to a provisional image shift amount based on kq in a range indicated by jq and jq+1. A signal 1301 corresponds to the object 1111 and a signal 1302 corresponds to the object 1112. The contrast analysis unit 139 analyzes a change in contrast before and after the image restoration (S207).

Figure 13B:
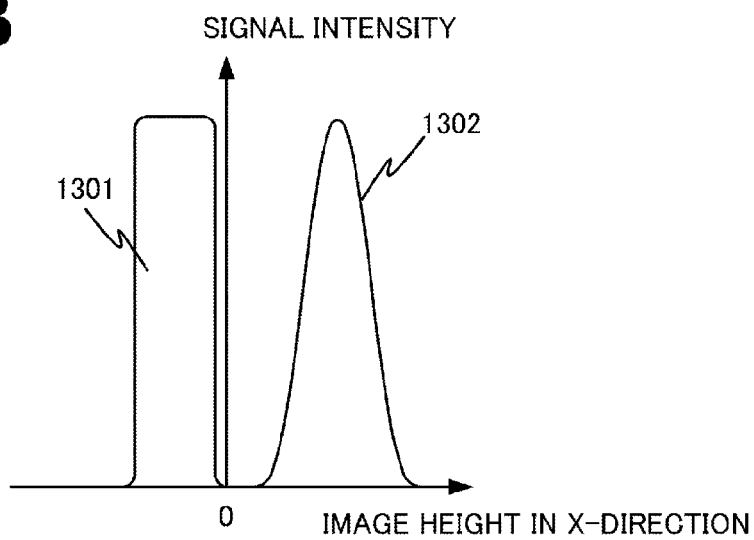

The depth determination unit 140 determines depths of the objects on the basis of a result of the contrast analysis (S208). As shown in FIG. 13A, the contrast of the object 1302 is the highest when an image restoration filter corresponding to the depth Lp is used. As shown in FIG. 13B, the contrast of the object 1301 is the highest when an image restoration filter corresponding to the depth Lq is used. In this way, the image restoration filter for obtaining highest contrast is different depending on the object in the depth detection region (NO in S702). Therefore, the depth determination unit 140 determines that the objects at different depths are present in the depth detection region (S704). The depth determination unit 140 determines the depth of the object 1302 as Lp and the depth of the object 1301 as Lq on the basis of the result of the contrast analysis.

In this way, it is possible to accurately perform a depth measurement operation using the correlation operation even when the objects of attention simultaneously include a distant place and a near place.

It is also preferable to perform the correlation operation again using the image signals corresponding to the depths with improved contrast after the image restoration processing and perform depth detection on the basis of an image shift amount at which maximum correlation is given. Since only objects at the same depth are set as targets and the image signals with improved contrast are used, accuracy of depth detection is improved.

Fourth Embodiment

A fourth embodiment is a modification of the first to third embodiments. After the depths of objects of attention are calculated according to the method in the first to third embodiments, a depth measurement region is reset on the basis of the calculated depths and depth detection is performed again. Consequently, an effect is obtained that it is possible to separate an object having a periodical pattern and an object including perspective.

Figure 14A:
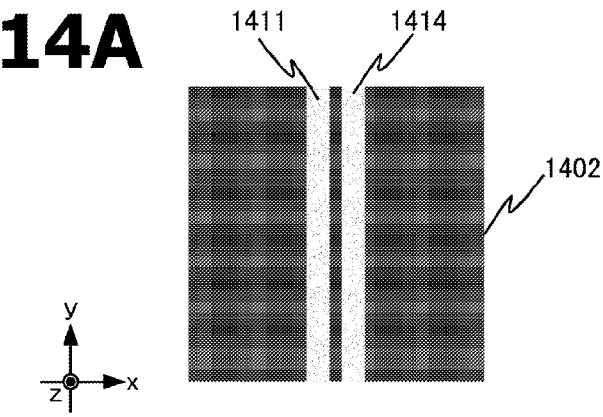
FIGS. 14A to 14C are diagrams for explaining resetting of a depth detection region (a fourth embodiment)
Figure 14B:
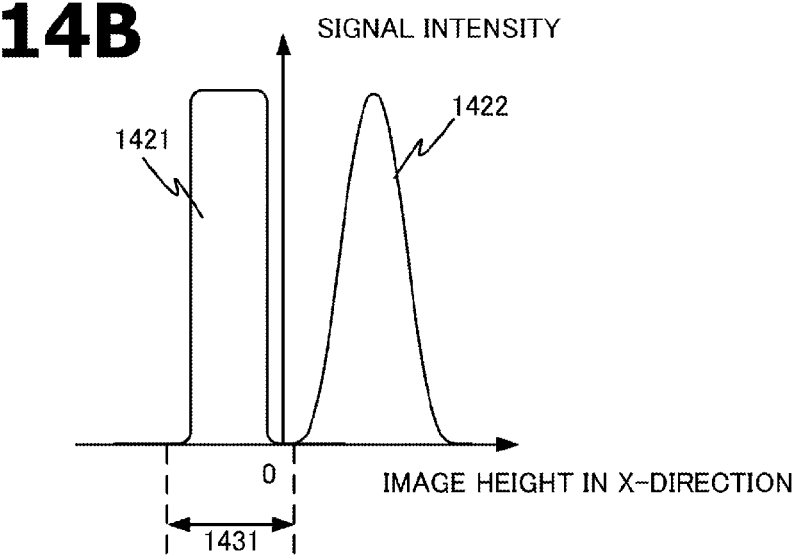
Figure 14C:
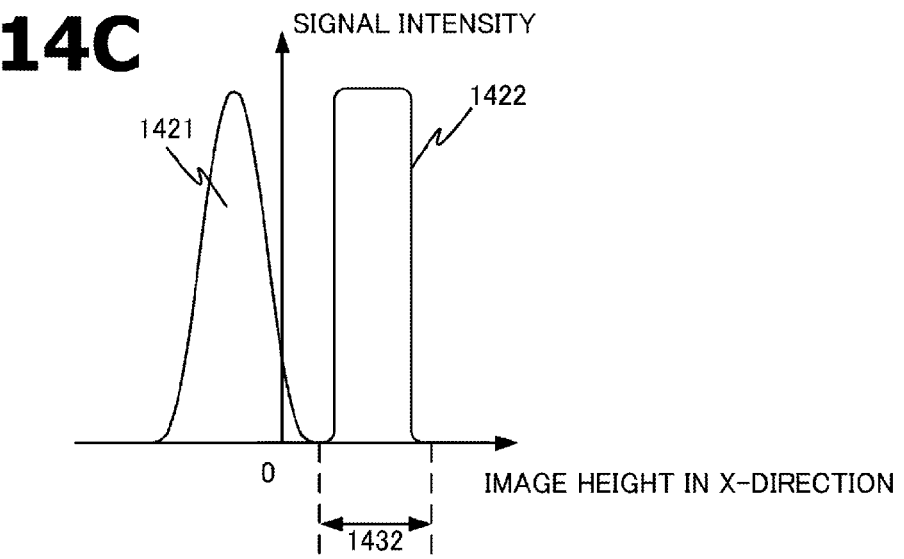

An example is provided in which an object pattern 1402 shown in FIG. 14A is photographed. FIGS. 14B and 14C show image signals after image restoration processing (S205). FIG. 14B is an A image after image restoration corresponding to the depth of an object 1411. FIG. 14C is an A image after image restoration corresponding to the depth of an object 1414. An image signal 1421 of the object 1411 has high contrast in the case of FIG. 14B. An image signal 1422 of the object 1414 has high contrast in the case of FIG. 14C. Therefore, a depth of each of objects (each of regions) is calculated by the method explained in the first and second embodiments.

In this embodiment, a depth detection region is reset on the basis of the depths calculated as explained above. Specifically, a region where objects at the same depth are present is reset as one depth detection region. In examples shown in FIGS. 14B and 14C, since the calculated depths are equal in a region 1431, the region 1431 is reset as one depth detection region. Similarly, since the calculated depths are equal in a region 1432, the region 1432 is reset as another depth detection region.

In this embodiment, depth calculation by a publicly-known method using a correlation operation is applied to the reset depth detection regions as explained above. That is, concerning various shift amounts, the correlation operation is applied to the reset depth detection regions. Depths are determined on the basis of a shift amount at which highest correlation is given.

As explained above, it is possible to separate the objects and set appropriate pixel regions as depth detection regions. By separating the objects, it is possible to prevent values of results of the correlation operations from being changed by mutual action of the objects. Therefore, since accuracy of the correlation operation is improved, it is also possible to attain improvement of depth measurement accuracy. Consequently, it is possible to efficiently perform a mutual operation excluding the influence of the objects. It is possible to attain improvement of depth measurement accuracy.

Fifth Embodiment

According to a fifth embodiment, an imaging surface depth measurement apparatus is explained, which acquires images having a parallax according to pupil division. It is possible to make a measurement system compact according to imaging surface depth measurement.

<Configuration of a Digital Camera>

Figure 15A:
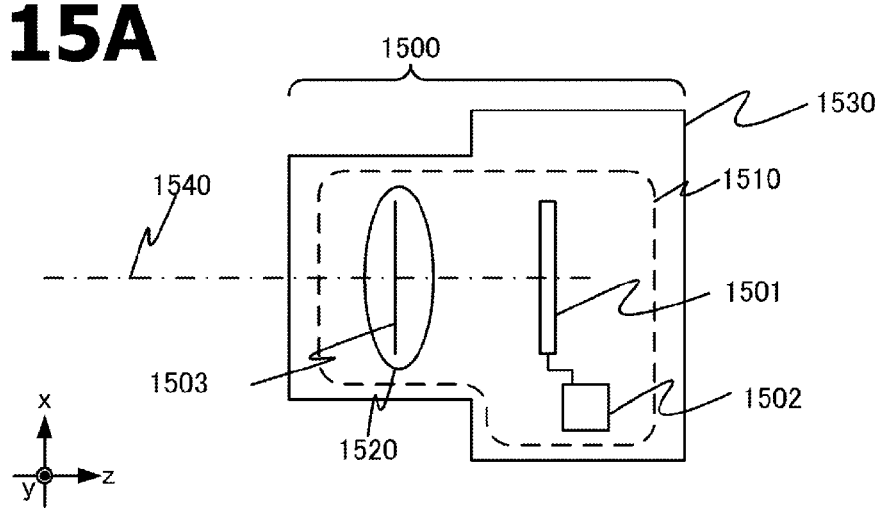
FIGS. 15A and 15B are diagrams showing the configuration of an imaging surface depth measurement apparatus (a fifth embodiment)

FIG. 15A shows a digital camera 1500 including a depth calculating apparatus according to this embodiment. The digital camera 1500 includes an imaging optical system 1520, an imaging element (a photodetector) 1501, a depth calculation unit 1502, and an image generation unit (not shown in the figure) arranged on the inside of a camera housing 1530. The depth calculating apparatus 1510 includes the imaging optical system 1520, the imaging element 1501, and the depth calculation unit 1502. The depth calculation unit 1502 can be configured using a logic circuit. As another form of the depth calculation unit 1502, the depth calculation unit 1502 may include a central processing unit (CPU) and a memory configured to store an arithmetic processing program.

The imaging optical system 1520 is a photographing lens of the digital camera 1500 and has a function of forming an image of an object on the imaging element 1501, which is an imaging surface. The imaging optical system 1520 includes a plurality of lens groups (not shown in the figure) and an aperture (not shown in the figure). The imaging optical system 1520 includes an exit pupil 1503 in a position a predetermined depth apart from the imaging element 1501. Reference numeral 1540 in FIG. 15A denotes an optical axis of the imaging optical system 1520.

<Configuration of the Imaging Element>

The imaging element 1501 is configured by a complementary metal oxide semiconductor (CMOS) or a charge coupled device (CCD). An object image formed on the imaging element 1501 via the imaging optical system 1520 is photoelectrically converted by the imaging element 1501 into an electric signal (also referred to as object image signal). In at least a part of the imaging element, a light receiving surface is divided into two or more regions to receive first and second light beams formed by different regions, which may overlap, on the exit pupil of the imaging optical system.

Figure 15B:
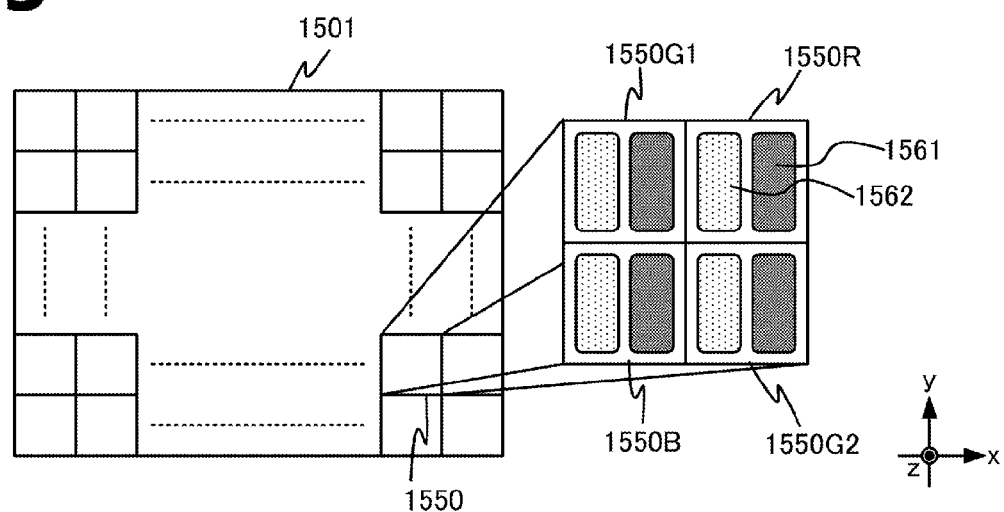

The imaging element 1501 in this embodiment is explained more in detail with reference to FIG. 15B. FIG. 15B is an xy sectional view of the imaging element 1501. The imaging element 1501 is configured by arraying a plurality of pixel groups 1550, each arranged in two rows and two columns. In the pixel group 1550, green pixels 1550G1 and 1550G2 are arranged in a diagonal direction and a red pixel 1550R and a blue pixel 1550B are arranged in the other two pixels. In the pixels included in the pixel group 1550, two photoelectrical conversion units (a photoelectric conversion section 1561 and a photoelectric conversion section 1562) having symmetrical sectional shapes on the xy section are arranged side by side in a light receiving layer (1603 in FIG. 16) in the pixels.

<Imaging Surface Depth Measurement>

Figure 16:
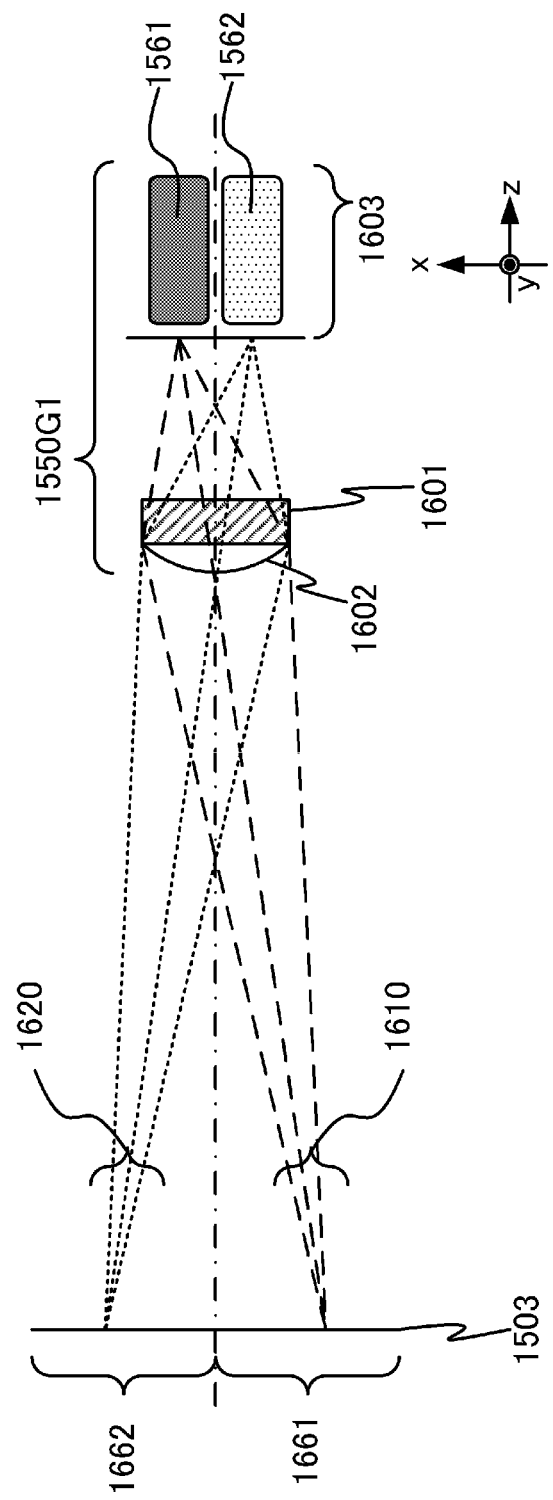
FIG. 16 is a diagram for explaining a light beam received by an imaging element (the fifth embodiment)

Light beams received by the photoelectric conversion section 1561 and the photoelectric conversion section 1562 in the imaging element 1501 are explained with reference to FIG. 16. FIG. 16 is a schematic diagram showing only the exit pupil 1503 of the imaging optical system 1520 and the green pixel 1550G1 as a representative example of the pixels arranged in the imaging element 1501. The pixel 1550G1 shown in FIG. 16 includes a color filter 1601, a micro lens 1602, and a light receiving layer 1603. The light receiving layer 1603 includes the photoelectric conversion section 1561 and the photoelectric conversion section 1562. The micro lens 1602 is arranged such that the exit pupil 1503 and the light receiving layer 1603 are in a conjugation relation. As a result, as shown in FIG. 16, a light beam 1610 passed through a pupil region 1661 in the exit pupil 1503 is made incident on the photoelectric conversion section 1561. A light beam 1620 passed through the pupil region 1662 is made incident on the photoelectric conversion section 1562.

Parallax images (an A image and a B image) are acquired by receiving, in different regions on an imaging element surface, a first light beam and a second light beam passing through different regions on an exit pupil of one imaging optical system as explained above. The configuration and processing content of the depth calculation unit 1502 are the same as the configuration and the processing contents in the first to fourth embodiments. Therefore, explanation of the configuration and the processing content is omitted.

When the present invention is applied to an imaging surface depth measurement element having the configuration explained above and a depth measurement operation principle and a photographing apparatus including the imaging surface depth measurement element, it is possible to highly accurately apply depth measurement to an object having a periodical pattern, an object including a distant place and a near place, and an object having a near pattern.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-93786, filed on Apr. 26, 2013, which is hereby incorporated by reference herein in its entirety.

What is claimed is:

1. A depth measurement apparatus comprising:
an image signal acquisition unit configured to acquire a first image signal from a first viewpoint and a second image signal from a second viewpoint;
a correlation value acquisition unit configured to calculate, with respect to a plurality of shift amounts, a correlation value between the first image signal in a depth detection region and the second image signal in a region obtained by shifting the depth detection region;
a provisional shift amount acquisition unit configured to acquire a plurality of provisional shift amounts on the basis of the correlation value;
an image restoration unit configured to subject, for each of the plurality of provisional shift amounts, at least one of the first image signal and the second image signal to image restoration using an image restoration filter corresponding to each of the plurality of provisional shift amounts;
a contrast analysis unit configured to analyze a contrast change resulting from image restoration processing by the image restoration unit; and
a depth determination unit configured to determine depths with respect to a plurality of pixels in the depth detection region on the basis of a result of contrast analysis by the contrast analysis unit, wherein
the provisional shift amount acquisition unit determines a first shift amount at which an extreme value of the correlation value is given, divides a first range, which is a range of a predetermined shift amount including the first shift amount, into a plurality of second ranges in order to acquire a provisional shift amount for each of the second ranges.

2. The depth measurement apparatus according to claim 1, wherein the depth determination unit determines, for each of objects in the depth detection region, a depth of the object on the basis of the provisional shift amount corresponding to the image restoration filter with which contrast of the object is highest by the image restoration processing.

3. The depth measurement apparatus according to claim 1, wherein, when there exists a plurality of first shift amounts at which extreme values of the correlation value are given, the provisional shift amount acquisition unit determines, as the first range, a range of a predetermined shift amount including the plurality of first shift amounts.

4. The depth measurement apparatus according to claim 1, wherein the first range is a range including the first shift amount and determined on the basis of a threshold of a correlation value.

5. The depth measurement apparatus according to claim 1, wherein, when a change in contrast resulting from the image restoration processing is consistent over the entire depth detection region, the depth determination unit determines that a periodical object is present in the depth detection region and, otherwise, the depth determination unit determines that a plurality of objects at different depths are present in the depth detection region.

6. The depth measurement apparatus according to claim 1, wherein, when a change in contrast resulting from the image restoration processing is consistent over the entire depth detection region, the depth determination unit determines one depth for the depth detection region.

7. The depth measurement apparatus according to claim 6, wherein, when a change in contrast resulting from the image restoration processing is consistent over the entire depth detection region, the depth determination unit calculates, with respect to an image signal after the image restoration processing by the image restoration filter with which the contrast is highest, a correlation value by means of the correlation value acquisition unit and determines a depth in the depth detection region on the basis of a shift amount at which an extreme value is given.

8. The depth measurement apparatus according to claim 1, wherein, when the depth determination unit determines that objects at different depths are present in the depth detection region, the depth measurement apparatus resets, as the depth detection region, a region where objects at the same depths are present and performs, with respect to the reset depth detection region, processing by the correlation value acquisition unit, the provisional shift amount acquisition unit, the image restoration unit, the contrast analysis unit, and the depth measurement unit in order to determine a depth.

9. The depth measurement apparatus according to claim 1, wherein,
when the depth determination unit determines that objects at different depths are present in the depth detection region, the depth measurement apparatus resets, as the depth detection region, a region where objects at the same depths are present and calculates, with respect to a depth of the reset depth detection region, a correlation value by means of the correlation value acquisition unit and determines a depth of the reset depth detection region on the basis of a shift amount at which an extreme value is given.

10. The depth measurement apparatus according to claim 1, wherein the provisional shift amount acquisition unit acquires a median of the second range as a provisional shift amount with respect to the second range.

11. The depth measurement apparatus according to claim 1, wherein the image restoration unit performs the image restoration using an image restoration filter corresponding to a depth calculated on the basis of the provisional shift amount.

12. The depth measurement apparatus according to claim 1, wherein the contrast analysis unit analyzes a change in sharpness in the depth detection region before and after the image restoration processing.

13. The depth measurement apparatus according to claim 1, wherein the contrast analysis unit analyzes a change in ringing in the depth detection region before and after the image restoration processing.

14. The depth measurement apparatus according to claim 1, wherein
   the image signal acquisition unit includes:
      an imaging optical system; and
      a plurality of photodetectors, a light receiving surface of at least a part of the photodetectors being divided into two or more regions to respectively receive a first light beam and a second light beam formed from different regions, which are allowed to overlap, on an exit pupil of the imaging optical system, and
   the image signal acquisition unit acquires the first image signal and the second image signal on the basis of an output from the photodetector, the light receiving surface of which is divided.

15. A control method for a depth measurement apparatus, the method comprising:
   acquiring a first image signal from a first viewpoint point and a second image signal from a second viewpoint;
   calculating, with respect to a plurality of shift amounts, a correlation value between the first image signal in a depth detection region and the second image signal in a region obtained by shifting the depth detection region;
   acquiring a plurality of provisional shift amounts on the basis of the correlation value;
   subjecting, for each of the plurality of provisional shift amounts, at least one of the first image signal and the second image signal to image restoration using an image restoration filter corresponding to each of the plurality of provisional shift amounts;
   analyzing a contrast change resulting from image restoration processing in the subjecting at least one of the first image signal and the second image signal to image restoration; and
   determining depths of a plurality of pixels in the depth detection region on the basis of a result of contrast analysis in the analyzing the contrast change, wherein
   the acquiring a plurality of provisional shift amount includes determining a first shift amount at which an extreme value of the correlation value is given, dividing a first range, which is a range of a predetermined shift amount including the first shift amount, into a plurality of second ranges, and acquiring a provisional shift amount for each of the second ranges.

* * * * *